United States Patent
Moscibroda et al.

(10) Patent No.: US 9,313,664 B2
(45) Date of Patent: Apr. 12, 2016

(54) CLOUD SERVICE FOR OPTIMIZING WHITE-SPACE NETWORKS COEXISTENCE

(75) Inventors: Thomas Moscibroda, Beijing (CN); Ranveer Chandra, Kirkland, WA (US); Paramvir Bahl, Bellevue, WA (US); Hariharan Rahul, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 861 days.

(21) Appl. No.: 13/188,395

(22) Filed: Jul. 21, 2011

(65) Prior Publication Data

US 2013/0023216 A1    Jan. 24, 2013

(51) Int. Cl.
  *H04W 16/00* (2009.01)
  *H04W 16/14* (2009.01)
  *H04W 88/06* (2009.01)

(52) U.S. Cl.
  CPC ............. *H04W 16/14* (2013.01); *H04W 88/06* (2013.01)

(58) Field of Classification Search
  CPC .................................................... H04W 16/14
  USPC ............... 455/454, 41.1, 41.2, 41.3, 447, 448
  See application file for complete search history.

(56) References Cited

U.S. PATENT DOCUMENTS

| 7,486,715 | B2 | 2/2009 | Bobier |
| 7,876,786 | B2 | 1/2011 | Bahl et al. |
| 8,315,645 | B2 * | 11/2012 | Zhou et al. ................... 455/454 |
| 2007/0253394 | A1 * | 11/2007 | Horiguchi et al. ............ 370/338 |
| 2009/0196180 | A1 | 8/2009 | Bahl et al. |
| 2009/0298522 | A1 * | 12/2009 | Chaudhri et al. ............ 455/509 |
| 2010/0046440 | A1 | 2/2010 | Singh |
| 2010/0124254 | A1 * | 5/2010 | Wu et al. ...................... 375/131 |
| 2010/0255794 | A1 * | 10/2010 | Agnew ............................ 455/77 |
| 2010/0301992 | A1 | 12/2010 | Chandra et al. |
| 2010/0304678 | A1 | 12/2010 | Chandra et al. |
| 2011/0032892 | A1 | 2/2011 | Bahl et al. |
| 2011/0053604 | A1 | 3/2011 | Kim et al. |
| 2011/0122855 | A1 * | 5/2011 | Henry ........................... 370/338 |
| 2011/0275322 | A1 * | 11/2011 | Sawai et al. ................. 455/41.2 |

OTHER PUBLICATIONS

Bahl, et al., "White Space Networking with Wi-Fi like Connectivity", Association for Computing Machinery (ACM) Special Interest Group on Data Communications (SIGCOMM), Aug. 17-21, 2009, pp. 12, ACM, Barcelona, Spain.

(Continued)

*Primary Examiner* — Wen Huang
(74) *Attorney, Agent, or Firm* — Alin Corie; Sandy Swain; Micky Minhas

(57) ABSTRACT

The coexistence of a plurality of different wireless networks that concurrently operate in a common geographic region is optimized. A query is received from a wireless node requesting advice on specific portions of a radio frequency spectrum to use. A spectrum recommendation procedure is then run to generate advice on recommended portions of the radio frequency spectrum for the wireless node to use in order to minimize one or more of interference in the spectrum, or noise in the spectrum, or contention in the spectrum. A recommendation reply is then sent to the wireless node which includes information specifying the recommended portions of the radio frequency spectrum for the wireless node to use in order to minimize one or more of interference in the spectrum, or noise in the spectrum, or contention in the spectrum.

20 Claims, 4 Drawing Sheets

(56) References Cited

OTHER PUBLICATIONS

Sadek, "Interference Management in the TV White Space", 2010 Fifth Institute of Electrical and Electronics Engineers (IEEE) Workshop on Networking Technologies for Software Defined Radio (SDR) Networks, Jun. 21, 2010, pp. 6, IEEE, Boston, Massachusetts, USA.

Cogeu (COGnitive radio systems for efficient sharing of TV white spaces in EUropean context) consortium, "COGEU response to the call for public input on the draft Radio Spectrum Policy Group (RSPG) Opinion on Cognitive Technologies (RSPG10-348)", Retrieved at <http://rspg.groups.eu.int/consultations/consultation_cognitiv_2010/cogeu_0115.pdf>, Jan. 15, 2011, pp. 5, RSPG, published online.

Baykas, et al., "Developing a Standard for TV White Space Coexistence: Technical Challenges and Solution Approaches", Institute of Electrical and Electronics Engineers (IEEE) 802.19 Wireless Coexistence Working Group, Retrieved at <http://www.ieee802.org/19/arc/stds-802-19list/docrnXZz7qdyl.doc> on Apr. 18, 2011, pp. 24, IEEE, published online.

"Enabling White Space Networks Independent of Low-Threshold Sensing", U.S. Appl. No. 12/822,218, filed Jun. 24, 2010, pp. 37, MS # 328545.01.

\* cited by examiner

CLOUD SERVICE FOR OPTIMIZING WHITE-SPACE NETWORKS COEXISTENCE

BACKGROUND

Due to factors such as economic globalization and ongoing advances in computing, data communication, and computer networking technologies, computer users across the globe are becoming increasingly mobile. Examples of such technology advances include the Internet, the World Wide Web, wireless networks, hand-held computing devices and mobile computing applications. The Internet now serves billions of users worldwide and provides its users with access to a vast array of online information resources and services, including those provided by the World Wide Web, intranet-based enterprises, and the like. Wireless networks have evolved into a near ubiquitous infrastructure that provides wireless network access to billions of users worldwide. Various types of hand-held computing devices are now commercially available which enable users to affordably perform full-fledged computing and data communication activities while they are on the move. The current generations of smartphones and tablet computers are examples of such hand-held computing devices. The types of mobile computing applications that are available to users continue to grow rapidly, as does the usage of these applications on hand-held computing devices. In fact, smartphones and tablet computers have become principal computing devices for many users. The confluence of these various factors and technologies has resulted in a rapidly growing demand for wireless network access.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Cloud service technique embodiments described herein generally involve optimizing the coexistence of a plurality of different wireless networks that concurrently operate in a common geographic region. In an exemplary embodiment a query is received from a wireless node requesting advice on specific portions of a radio frequency spectrum to use. A spectrum recommendation procedure is then run to generate advice on recommended portions of the radio frequency spectrum for the wireless node to use in order to minimize one or more of interference in the spectrum, or noise in the spectrum, or contention in the spectrum. A recommendation reply is then sent to the wireless node which includes information specifying the recommended portions of the radio frequency spectrum for the wireless node to use in order to minimize one or more of interference in the spectrum, or noise in the spectrum, or contention in the spectrum.

DESCRIPTION OF THE DRAWINGS

The specific features, aspects, and advantages of the cloud service technique embodiments described herein will become better understood with regard to the following description, appended claims, and accompanying drawings where:

DETAILED DESCRIPTION

Figure 1:
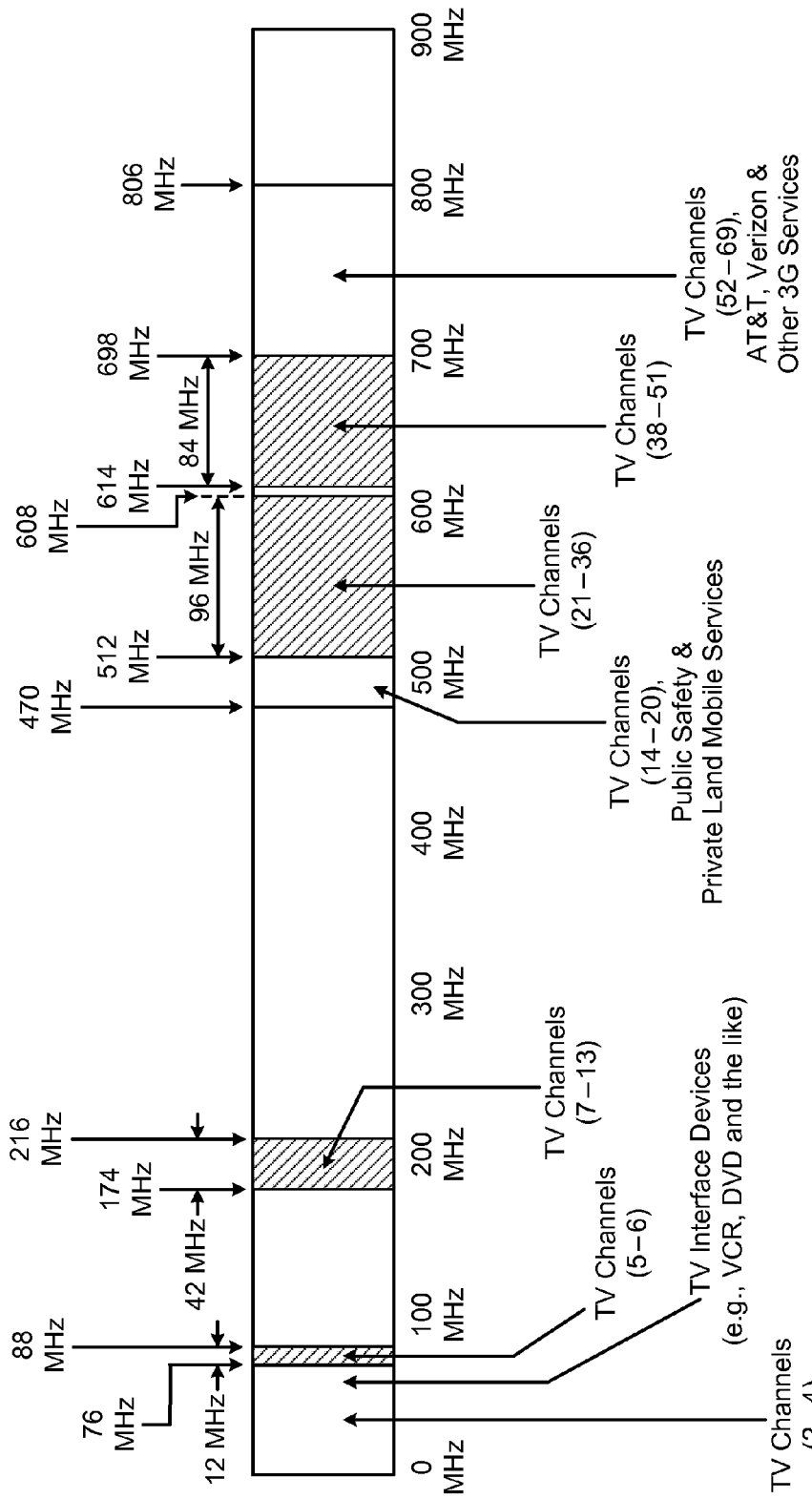
FIG. 1 is a diagram illustrating an exemplary embodiment, in simplified form, of white-space within the broadcast television frequency spectrum that is sanctioned by the Federal Communications Commission (FCC) to be potentially available to FCC-certified wireless devices for unlicensed wireless communication in the United States.

In the following description of cloud service technique embodiments reference is made to the accompanying drawings which form a part hereof, and in which are shown, by way of illustration, specific embodiments in which the cloud service technique can be practiced. It is understood that other embodiments can be utilized and structural changes can be made without departing from the scope of the cloud service technique embodiments.

The term "wireless node" is used herein to refer to any wireless device (such as a wireless computing device, or a wireless base station, or the like) that uses the radio frequency (RF) spectrum for wireless communication. The term "white-space spectrum" is used herein to refer to white-space within the broadcast television (TV) frequency spectrum (also known as the very high frequency (VHF) and ultra high frequency (UHF) spectrum). The term "white-space node" is used herein to refer to any FCC-certified wireless node that wants to use the white-space spectrum for unlicensed wireless communication. Thus, a white-space node is a particular type of wireless node. The term "white-space network" is used herein to refer to a wireless network that operates in the white-space spectrum and provides connectivity between a plurality of white-space nodes.

1.0 White-Space Spectrum

Generally speaking and as is appreciated in the art of broadcast TV, broadcast TV content is commonly disseminated via RF signal broadcasts on designated frequency bands (also known as "channels") within the frequency spectrum between 54 MHz and 890 MHz. More particularly and by way of example but not limitation, in North America, broadcast TV content is disseminated on TV channels numbered 2 through 69, each of which are assigned to a different frequency band within the frequency spectrum approximately between 54 MHz and 806 MHz. Traditionally, this particular frequency spectrum is divided into two different sections, namely a VHF band and a UHF band. The VHF band is further subdivided into two different sections, namely a VHF low-band and a VHF high-band. The VHF low-band includes TV channels 2-6 and spans the frequency spectrum approximately between 54 MHz and 88 MHz. The VHF high-band includes TV channels 7-13 and spans the frequency spectrum approximately between 174 MHz and 216 MHz. The UHF band includes TV channels 14-69 and spans the frequency spectrum approximately between 470 MHz and 806 MHz.

As is also appreciated in the art of broadcast TV, the portions of the VHF and UHF bands of the broadcast TV frequency spectrum which are not currently being used in a given geographic region are known as "white-space." In the United States the incumbent principal users of this white-space are broadcast TV stations and certain wireless microphones, which are registered with the Federal Communications Commission (FCC) and licensed thereby to use designated frequency bands within the broadcast TV frequency spectrum. Such registered and licensed incumbent principal users are hereafter simply referred to as "licensed incumbent users." Each broadcast TV station is generally a wide-band broadcaster which uses a full TV channel for its broadcast (i.e., each broadcast TV station generally uses a 6 MHz band of the broadcast TV frequency spectrum). Each wireless microphone is generally a narrow-band broadcaster which uses just a small portion of a TV channel for its broadcast (e.g., each wireless microphone generally uses approximately a 200 kHz band of the broadcast TV frequency spectrum).

Recent rulings by the FCC generally permit the opportunistic use of the white-space spectrum for unlicensed wireless communication in the United States in order to increase the amount of wireless network access that is available. In other words, the FCC now permits any white-space node to use the white-space spectrum for unlicensed wireless communication assuming the node meets certain FCC-imposed regulations (such as maximum transmission power, among others) which ensure that the node does not interfere with the licensed incumbent users of the spectrum. It is noted that the regulatory commissions in other countries in Europe, Asia and Latin America are currently considering permitting a similar use of the white-space spectrum for unlicensed wireless communication in these countries.

FIG. 1 illustrates an exemplary embodiment, in simplified form, of the white-space spectrum that is sanctioned by the FCC to be potentially available to wireless devices for unlicensed wireless communication in the United States. As exemplified in FIG. 1, the FCC-sanctioned white-space spectrum includes 12 MHz of potentially available bandwidth that encompasses TV channels 5 and 6 (i.e., the frequency band approximately between 76 MHz and 88 MHz). The FCC-sanctioned white-space spectrum also includes 42 MHz of potentially available bandwidth that encompasses TV channels 7-13 (i.e., the frequency band approximately between 174 MHz and 216 MZ). The FCC-sanctioned white-space spectrum also includes 96 MHz of potentially available bandwidth that encompasses TV channels 21-36 (i.e., the frequency band approximately between 512 MHz and 608 MHz). The FCC-sanctioned white-space spectrum also includes 84 MHz of potentially available bandwidth that encompasses TV channels 38-51 (i.e., the frequency band approximately between 614 MHz and 698 MHz).

It will be appreciated that the particular portions of the FCC-sanctioned white-space spectrum that are not currently being used by any licensed incumbent users in a given geographic region, and thus are currently available to be used for unlicensed wireless communication by a given white-space node that is currently located in the region, can depend on various factors such as the current geographic location of the node, the current day and the current time of day, among others. It will further be appreciated that there are various differences between the white-space spectrum and other portions of the RF spectrum that are made available by the FCC for unlicensed use (such as the 2,450 MHz industrial, scientific and medical (ISM) frequency band which is where wireless networks such as Bluetooth and IEEE (Institute of Electrical and Electronics Engineers) 802.11 Wi-Fi commonly operate). Examples of these differences will now be described.

Based on the aforementioned recent rulings by the FCC, a given white-space node can use a given portion of the white-space spectrum for unlicensed wireless communication just in the circumstance when there is no licensed incumbent user currently using this portion of the spectrum. It will be appreciated that the portions of the white-space spectrum that are available for use by the white-space node (e.g., the number of unused TV channels) can vary greatly at different points in time. Generally speaking, less of the white-space spectrum is available for use by the white-space node during business hours when a larger number of TV stations and wireless microphones are broadcasting, and more of the white-space spectrum is available for use by the node in the middle of the night when a smaller number of TV stations and wireless microphones are broadcasting. In contrast, in the other portions of the RF spectrum that are made available by the FCC for unlicensed use, the available spectrum is time-invariant.

It will further be appreciated that the portions of the white-space spectrum that are available for use by the white-space node can also vary greatly in different geographic regions. Generally speaking, less of the white-space spectrum is available for use by the white-space node in urban geographic regions, and more of the white-space spectrum is available for use by the node in rural geographic regions. In contrast, in the other portions of the RF spectrum that are made available by the FCC for unlicensed use, the available spectrum is location independent (i.e., the available spectrum is the same across the United States). Additionally, the portions of the white-space spectrum that are available for use by the white-space node may be fragmented (i.e., these portions may not be available as one contiguous chunk in the white-space spectrum). In contrast, in the other portions of the RF spectrum that are made available by the FCC for unlicensed use, no fragmentation occurs in the available spectrum.

It will yet further be appreciated that the white-space spectrum is at a significantly lower frequency than the ISM frequency band or other unlicensed portions of the RF spectrum. As a result, given a common transmission power the transmission range achieved over the white-space spectrum is significantly larger than the transmission range achieved over the ISM frequency band. Additionally, the VHF and UHF bands have very good signal propagation properties. By way of example but not limitation, the VHF and UHF bands penetrate well through physical obstacles (such as walls and trees, among others) and are relatively little affected by weather conditions. For these reasons and others, the cloud service technique embodiments described herein are advantageous in networking scenarios where having a larger transmission range plays a key role.

The aforementioned recent rulings by the FCC mandate the use of a geo-location spectrum database which generally keeps track of which portions of the white-space spectrum are currently being used by licensed incumbent users in the various geographic regions of the United States. Generally speaking and as will be described in more detail hereafter, a given white-space node can access the geo-location spectrum database to determine the portions of the white-space spectrum that are not currently being used by any licensed incumbent users in a given geographic region which includes the current geographic location of the node. Such portions of the white-space spectrum are hereafter sometimes simply referred to as the "available portions of the white-space spectrum" (i.e., the portions of the spectrum that are available to be used for white-space networking). More particularly, each white-space node is mandated by the FCC to periodically query the geo-location spectrum database, where the query includes, but is not limited to, an identifier that uniquely identifies the node, and information specifying the current geographic location of the node. The query can optionally also include additional information which is described in more detail hereafter. Upon receiving the query from the white-space node, the geo-location spectrum database determines the portions of the white-space spectrum (e.g., the particular TV channels) that are not currently being used by any licensed incumbent users for the current geographic location of the node and then sends a reply back to the node specifying these available portions of the spectrum (e.g., specifies the TV channels that are not currently being used by any licensed incumbent users). Upon receiving the reply from the geo-location spectrum database, the white-space node is permitted to transmit wirelessly over any of the specified available portions of the white-space spectrum (e.g., over any of the unused TV channels).

1.1 Types of White-Space Networks

This section describes various types of white-space networks that can be supported by the cloud service technique embodiments described herein. The cloud service technique embodiments generally support various white-space networking scenarios. As will now be described in more detail, a given white-space network can have different characteristics which depend on the specific scenario the network is deployed for.

Given the aforementioned FCC-imposed regulation regarding maximum transmission power, the white-space spectrum can be used for unlicensed wireless communication over a relatively large transmission range. One exemplary white-space networking scenario that necessitates communication over a large transmission range is connectivity between white-space nodes in a rural setting where the transmission range can be a plurality of miles. Another exemplary white-space networking scenario that necessitates communication over a large transmission range is connectivity between white-space nodes in a campus setting where a university or industrial campus (among other types of campuses) is covered by one or more white-space base stations. In such a campus setting scenario it is reasonable to expect each base station to have a transmission range of approximately one mile. The white-space spectrum can also be used for unlicensed wireless communication over a smaller transmission range. Exemplary white-space networking scenarios that necessitate smaller-range communication include, but are not limited to, connectivity between white-space nodes within a home, or within an office, or between neighboring homes. Thus, a given white-space network can be categorized as being either long-range or short-range depending on the desired transmission range and the related distance of the communication links between the various white-space nodes in the network. A long-range white-space network is hereafter simply referred to as a "long-range network" and a short-range white-space network is hereafter simply referred to as a "short-range network."

A given white-space network can also belong to both the long-range and short-range categories. In other words, a given white-space network can also include both long-range links and short-range links.

A given white-space network can also be categorized as being either wide-band or narrow-band. Generally speaking, a wide-band white-space network (hereafter simply referred to as a "wide-band network") communicates over a wide-band communication channel, and a narrow-band white-space network (hereafter simply referred to as a "narrow-band network") communicates over a narrow-band communication channel. More particularly, a wide-band network is herein defined to be a white-space network that either uses one full unused TV channel (i.e., a full 6 MHz frequency band) for its communication links, or uses a plurality of unused TV channels for its communication links (i.e., a plurality of unused TV channels are combined together in order to achieve higher network bandwidth). In the case where a wide-band network uses a plurality of unused TV channels which are combined together, such a network can be partitioned into the following two classes. One class is a wide-band network that combines only adjacent unused TV channels together thus forming a single, contiguous communication channel. The other class is a wide-band network that combines non-adjacent unused TV channels into a logical communication channel. A narrow-band network is herein defined to be a white-space network that uses less than a full unused TV channel for its communication links.

2.0 Cloud Service for Optimizing White-Space Networks Coexistence

Since the white-space spectrum is unlicensed, it will be appreciated that many different white-space networks of potentially different types may potentially want to share the spectrum at the same time and in either the same geographic region or overlapping geographic regions. As described heretofore, each individual white-space network can be either a long-range network or a short-range network. Furthermore, each individual white-space network can be either a wide-band network or a narrow-band network. Thus, it will further be appreciated that it is possible for a plurality of different white-space networks to "overlap" in the white-space spectrum. In other words, it is possible for a plurality of different white-space networks to want to use a common portion of the white-space spectrum in a common geographic region at the same time.

It will be appreciated that various situations are possible where a plurality of white-space networks can be operating in a common geographic region at the same time. By way of example but not limitation, a plurality of long-range networks can be actively operating in approximately the same geographic region at the same time. A plurality of short-range networks can also be actively operating in approximately the same geographic region at the same time. One or more long-range networks can also be actively operating in a geographic region that overlaps with one or more other geographic regions in which one or more short-range networks are actively operating. Given the aforementioned large transmission range, very good signal propagation properties and unlicensed use of the white-space spectrum, combined with the aforementioned rapidly growing demand for wireless network access, the probability of such overlapping taking place is ever-increasing.

The cloud service technique embodiments described herein are generally applicable to optimizing the coexistence of a plurality of different wireless networks that concurrently operate in a common geographic region. In an exemplary embodiment of the cloud service technique the different wireless networks are white-space networks that operate in the white-space spectrum and provide connectivity between a plurality of white-space nodes.

The cloud service technique embodiments described herein are advantageous for various reasons including, but not limited to, the following. As will be appreciated from the more detailed description that follows, the cloud service technique embodiments optimize the fair and/or efficient coexistence of a plurality of different white-space networks that concurrently operate in a common geographic region. These white-space networks can be any combination of long-range and short-range networks, and can also be any combination of wide-band and narrow-band networks. The cloud service technique embodiments also minimize one or more of the interference, or noise, or contention that can occur between different white-space networks that concurrently operate in a common geographic region, regardless of the particular type(s) of networks that are operating and the particular portion(s) of the spectrum they are using. In other words, the cloud service technique embodiments ensure the fair and/or efficient coexistence of a plurality of different long-range networks that concurrently operate in a common geographic region. The cloud service technique embodiments also ensure the fair and/or efficient coexistence of a mix of different long-range and short-range networks that concurrently operate in a common geographic region. The cloud service technique embodiments also ensure the fair and/or efficient coexistence of a mix of different wide-band and narrow-band networks that concurrently operate in a common geographic region.

Additionally, the cloud service technique embodiments described herein are adaptive in that they continually optimize the efficiency and fairness of the white-space networks coexistence in a given geographic region regardless of changing white-space spectrum usage by both licensed incumbent users and white-space nodes. The cloud service technique embodiments also eliminate the destructive overlap (along with the related interference and contention) that can occur when two or more different white-space networks are concurrently operating in a common geographic region and are using a common portion of the white-space spectrum. The cloud service technique embodiments can also eliminate the need for the white-space nodes to measure the amount of interference, noise and contention on each TV channel in the white-space spectrum before deciding which TV channel is the optimal one to use.

2.1 Architectural Framework

Figure 2:
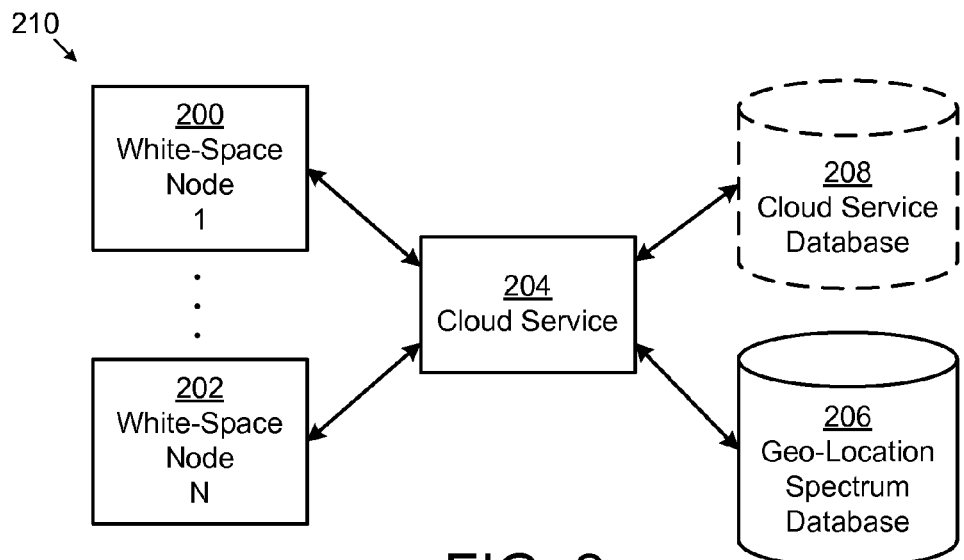
FIG. 2 is a diagram illustrating one embodiment, in simplified form, of an architectural framework for implementing the cloud service technique embodiments described herein.

FIG. 2 illustrates one embodiment, in simplified form, of an architectural framework for implementing the cloud service technique embodiments described herein. As exemplified in FIG. 2, this particular architectural framework embodiment 210 generally includes one or more white-space nodes 200 and 202, a cloud service 204 which is accessible by the white-space nodes, and the aforementioned FCC-mandated geo-location spectrum database 206 which is accessible by the cloud service. Although not shown in FIG. 2, it is noted that the geo-location spectrum database 206 is also accessible by the white-space nodes 200 and 202. The architectural framework embodiment 210 can optionally also include a cloud service database 208 which is accessible by the cloud service 204. The operation of the white-space nodes 200 and 202, the cloud service 204, the geo-location spectrum database 206 and the cloud service database 208, along with the interactions there-between, will be described in more detail hereafter.

Generally speaking and as will be described in more detail hereafter, any white-space node can query the cloud service to request advice on specific portions of the white-space spectrum (e.g., recommended TV channels, or recommended frequency bands, or the like) to use. Upon receiving such a query from a given white-space node which is operating in a given geographic region, the cloud service can provide the node with information specifying recommended portions of the white-space spectrum for the node to use in order to minimize one or more of interference in the spectrum, or noise in the spectrum, or contention in the spectrum (i.e., in order to ensure fair and/or efficient coexistence of the node with the different white-space networks that are currently operating in the white-space spectrum in the geographic region).

Referring again to FIG. 2, in one implementation of the cloud service technique embodiments described herein the cloud service 204 and cloud service database 208 can be implemented on the same computing device as the geo-location spectrum database 206 (i.e., the cloud service and cloud service database can be logically integrated with the spectrum database). In another implementation of the cloud service technique embodiments the cloud service 204, cloud service database 208 and geo-location spectrum database 206 can be implemented on different computing devices.

Figure 3:
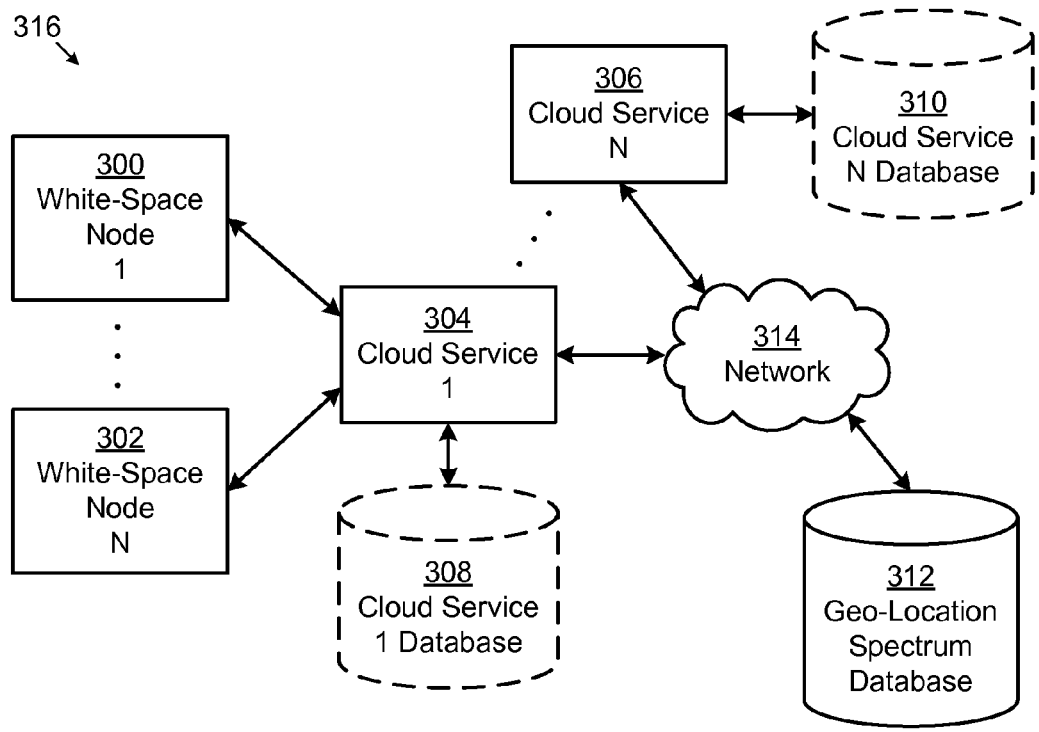
FIG. 3 is a diagram illustrating another embodiment, in simplified form, of an architectural framework for implementing the cloud service technique embodiments described herein.

FIG. 3 illustrates another embodiment, in simplified form, of an architectural framework for implementing the cloud service technique embodiments described herein. As exemplified in FIG. 3, this particular architectural framework embodiment 316 generally includes one or more white-space nodes 300 and 302, a cloud service 304 which is accessible by the white-space nodes, one or more other cloud services 306, and the geo-location spectrum database 312. The architectural framework embodiment 316 also includes a network 314 which allows each of the cloud services 304 and 306 to access the geo-location spectrum database 312, and also allows the cloud services to communicate with each other. Although not shown in FIG. 3, it is noted that the geo-location spectrum database 312 is also accessible by the white-space nodes 300 and 302. The architectural framework embodiment 316 can optionally also include a plurality of different cloud service databases 308 and 310 each of which is accessible by a different one of the cloud services 304 and 306. It is noted that an alternate embodiment (not shown) of this architectural framework is also possible where the plurality of different cloud service databases are replaced by a central cloud service database which is shared by each of the different cloud services.

Referring again to FIG. 3, in an exemplary embodiment of the cloud service technique described herein each of the different cloud services 304 and 306 can be operated by a different provider, and these different cloud services can communicate with each other and exchange information with each other using a common application programming interface (API). This is advantageous since it allows each cloud service to access the very latest white-space network usage and performance information from the other cloud services.

2.2 Process Framework

Figure 4:
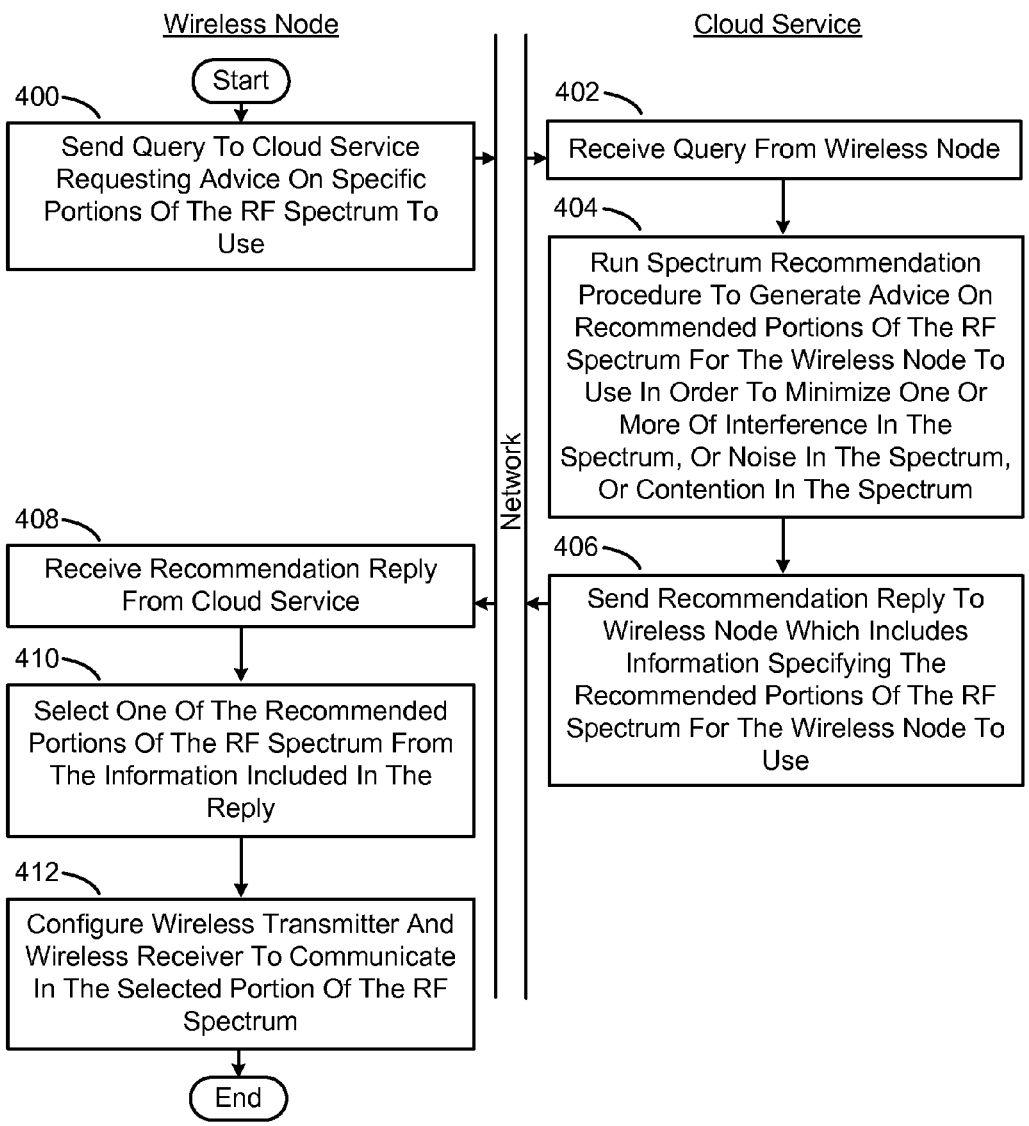
FIG. 4 is a flow diagram illustrating an exemplary embodiment, in simplified form, of a process for optimizing the coexistence of a plurality of different wireless networks that concurrently operate in a common geographic region.

FIG. 4 illustrates an exemplary embodiment, in simplified form, of a process for optimizing the coexistence of a plurality of different wireless networks that concurrently operate in a common geographic region. As exemplified in FIG. 4, the process starts in block 400 with a given wireless node sending a query to the cloud service requesting advice on specific portions of the RF spectrum to use. When the cloud service receives the query from the wireless node (block 402), the cloud service runs a spectrum recommendation (SR) procedure to generate advice on recommended portions of the RF spectrum for the wireless node to use in order to minimize one or more of interference in the spectrum, or noise in the spectrum, or contention in the spectrum (block 404). The cloud service then sends a recommendation reply to the wireless node which includes information specifying the recommended portions of the RF spectrum for the wireless node to use (block 406). When the wireless node receives the recommendation reply from the cloud service (block 408), the wireless node selects one of the recommended portions of the RF spectrum from the information included in the reply (block 410). The wireless node then configures its wireless transmitter and wireless receiver to communicate in the selected portion of the RF spectrum (block 412). In other words, the wireless node tunes its wireless transmitter and receiver to operate in the selected portion of the RF spectrum.

As described heretofore, in an exemplary embodiment of the cloud service technique described herein the wireless nodes are white-space nodes. Accordingly, the RF spectrum that the wireless nodes wish to use is the white-space spectrum, and the different wireless networks that concurrently operate in a common geographic region are white-space networks. Furthermore, the SR procedure generates advice on recommended portions of the white-space spectrum for a querying white-space node to use, and it is this information that is included in the recommendation reply that the cloud service sends to the node. It is this exemplary context that will be assumed for the remainder of this section.

In an exemplary embodiment of the cloud service technique described herein the query that the white-space node sends to the cloud service is implemented as a data string and includes an identifier that uniquely identifies the white-space node, and information specifying the current geographic location of the node. The query can optionally also include information specifying the type of white-space network the white-space node wants to use (e.g., whether the node wants to use a long-range or short-range network, and whether the node wants to use a wide-band or narrow-band network). The query can optionally also include information specifying an expected network load of the white-space node. By way of example but not limitation, the query can include information specifying whether the white-space node plans to transmit large amounts or small amounts of data over the network. In the case where the white-space node is a white-space base station, the query can include information specifying the number of client devices that are attached to the base station, and may also include information specifying the current geographic location of each of these client devices.

The query that the white-space node sends to the cloud service can optionally also include information specifying the network response-time needs of the node (e.g., whether the node requires fast network response-time or can tolerate slower network response-time). The query can optionally also include information specifying a network identifier (such as a conventional service set identifier (SSID), among others) which identifies a specific wireless network that the white-space node wants to connect to. The query can optionally also include information specifying the wireless networking capabilities of the white-space node. Examples of such capabilities include one or more of whether or not the white-space node is capable of bonding a plurality of channels together, or whether or not the node is capable of performing subcarrier suppression (which, as is appreciated in the art of wireless networking, allows the node to use just a fraction of a given TV channel or frequency band), among others.

Generally speaking, the cloud service collects information about the current white-space spectrum usage in different geographic regions and can store the collected information in the cloud service database. This information collection can be accomplished in various ways including, but not limited to, the following. In one embodiment of the cloud service technique described herein the query that the white-space node sends to the cloud service can include information specifying the portions of the white-space spectrum that are not currently being used by any licensed incumbent users in the current geographic location of the white-space node. As described heretofore, the white-space node can get this current white-space spectrum usage information by periodically querying the geo-location spectrum database and including its current geographic location in the query. In another embodiment of the cloud service technique where the cloud service and cloud service database are logically integrated with the geo-location spectrum database, the cloud service can directly access the geo-location spectrum database as needed in order to determine the portions of the white-space spectrum that are not currently being used by any licensed incumbent users in the current geographic location of a given white-space node.

In addition to querying the cloud service as described heretofore, the white-space nodes can optionally periodically send explicit information that the nodes locally observe about the current white-space spectrum usage to the cloud service. By way of example but not limitation, a given white-space node can optionally send explicit information to the cloud service specifying the node's current network activities in a particular portion of the white-space spectrum (e.g., a particular TV channel or a particular frequency band in the spectrum). A given white-space node can also optionally send explicit information to the cloud service specifying the characteristics and network types of other white-space nodes that are using the white-space spectrum. A given white-space node can also optionally send explicit information to the cloud service specifying the current interference level the node measures in one or more particular portions of the white-space spectrum. A given white-space node can also optionally send explicit information to the cloud service specifying the current contention level the node measures in one or more particular portions of the white-space spectrum. A given white-space node can also optionally send explicit information to the cloud service specifying the current network traffic characteristics (such as network load levels, or contention levels, or the like) the node observes in one or more particular portions of the white-space spectrum. A given white-space node can also optionally send explicit information to the cloud service specifying the current noise levels the node measures in one or more particular portions of the white-space spectrum. Whenever the cloud service receives any of these types of explicit information from the white-space nodes, the cloud service can store the received explicit information in the cloud service database.

In one embodiment of the cloud service technique described herein the information specifying the recommended portions of the white-space spectrum that is included in the recommendation reply to the white-space node is in the form of a list of recommended TV channels in the spectrum. In another embodiment of the cloud service technique the information specifying the recommended portions of the white-space spectrum that is included in the recommendation reply to the white-space node is in the form of a list of recommended frequency bands in the spectrum.

As will be described in more detail hereafter, besides the recommendation reply from the cloud service to a querying white-space node including information specifying recommended portions of the white-space spectrum for the node to use, the recommendation reply can also include various types of additional information. By way of example but not limitation, the recommendation reply can also include information specifying one or more of a recommended transmission power level that the cloud service advises the querying white-space node to use, or a recommended subcarrier that the cloud service advises the node to suppress, or a recommended modulation scheme that the cloud service advises the node to use. Whenever a querying white-space node receives a recommendation reply from the cloud service that includes information specifying a recommended transmission power level that the node is advised to use, the node can configure its wireless transmitter to transmit at this power level. Whenever a querying white-space node receives a recommendation reply from the cloud service that includes information specifying a recommended subcarrier that the node is advised to suppress, the node can configure its wireless transmitter to suppress this subcarrier. Whenever a querying white-space node receives a recommendation reply from the cloud service that includes information specifying a recommended modulation scheme that the node is advised to use, the node can configure its wireless transmitter to perform this modulation scheme.

2.3 Spectrum Recommendation (SR) Procedure

This section provides a more detailed description of the aforementioned SR procedure which is run by the cloud service. Generally speaking, upon the cloud service receiving a query from a given white-space node, the SR procedure first determines the available portions of the white-space spectrum (i.e., the portions of the spectrum that are not currently being used by any licensed incumbent users in a geographic region which includes the current geographic location of the white-space node). The SR procedure then uses the information that is included in the query, along with other applicable white-space network usage and performance information that may be available to the cloud service, to generate advice on recommended portions of the white-space spectrum for the node to use in order to minimize one or more of interference in the spectrum, or noise in the spectrum, or contention in the spectrum. As described heretofore, the other applicable white-space network usage and performance information that may be available to the cloud service includes, but is not limited to, one or more of information stored in the cloud service database, or information stored in the geo-location spectrum database, or information that is access by communicating with other cloud services via the aforementioned common API. The SR procedure thus strives to ensure that the various white-space nodes which are operating in a common geographic region have fair and/or efficient access to the white-space spectrum. The SR procedure achieves this objective in the following manner.

As will be described in more detail hereafter, the SR procedure uses the following general spectrum assignment rules. The SR procedure generally advises different white-space networks to use different available portions of the white-space spectrum whenever possible. This is advantageous since having the different white-space networks each operating in a different available portion of the white-space spectrum achieves good load-balancing in the spectrum and allows each network to independently choose a medium access control protocol that optimally meets the needs of the network. One exception to this rule is, whenever a wide-band network is capable of performing subcarrier suppression, the SR procedure can advise the wide-band network to use the same portion of the spectrum as a narrow-band network (in this way, the wide-band and narrow-band networks can efficiently share the same portion of the spectrum since both networks can transmit at the same time without causing interference to each other). The SR procedure generally advises different types of white-space networks (e.g., long-range versus short-range networks, and wide-band versus narrow-band networks) to use different available portions of the white-space spectrum whenever possible. However, whenever this is not possible due to there being an insufficient number of available portions of the white-space spectrum (i.e., whenever one or more different white-space networks have to use the same portion of the spectrum), the SR procedure can advise different networks of the same type to use the same portion of the spectrum.

Exemplary types of advice that can be generated by the SR procedure in exemplary white-space node query scenarios will now be described. It will be appreciated that in addition to the exemplary advice and scenarios described hereafter, many other types of advice can be generated by the SR procedure in other white-space node query scenarios.

2.3.1 Coexistence of Long-Range Networks

There are various ways in which the SR procedure can optimize the coexistence of long-range networks which operate in a common geographic region (and thus overlap in the white-space spectrum).

In an exemplary embodiment of the cloud service technique described herein the SR procedure can optimize the coexistence of long-range networks which operate in a common geographic region by advising a querying white-space node that wants to use a long-range network to use portions of the white-space spectrum having a low contention level (i.e., the recommended portions of the spectrum have little contention from other networks) or a low noise level. This serves to optimize the load balance across the available portions of the white-space spectrum.

By way of example but not limitation, whenever the cloud service receives a query from a white-space node which includes information specifying that the node wants to use a long-range network, and there is a plurality of available portions of the white-space spectrum (i.e., more than one portion of the spectrum is available to be used for white-space networking by the node), and one or more of the plurality of available portions are not currently being used by any other white-space nodes, then the recommendation reply to the querying node will include a list of the available portions of the spectrum that are not currently being used by any other white-space nodes. Whenever the cloud service receives a query from a white-space node which includes information specifying that the node wants to use a long-range network, and there is a plurality of available portions of the white-space spectrum, and all of the plurality of available portions are currently being used by other white-space nodes, then the recommendation reply to the querying node will include a list of the available portions of the spectrum whose current contention level is below a prescribed threshold and whose current interference level is below another prescribed threshold.

2.3.2 Coexistence of Long-Range and Short-Range Networks

There are various ways in which the SR procedure can optimize the coexistence of long-range networks and short-range networks which operate in a common geographic region.

In one embodiment of the cloud service technique described herein the SR procedure can optimize the coexistence of one or more long-range networks and one or more short-range networks which all operate in a common geographic region by advising querying white-space nodes that want to use a long-range network to use different portions of the white-space spectrum than querying white-space nodes that want to use a short-range network (i.e., the long-range and short-range networks are separated onto different portions of the spectrum). More particularly, the SR procedure can reserve a prescribed number of the available portions of the white-space spectrum for use by white-space nodes that want to use a short-range network, and the remaining available portions of the spectrum can be used by white-space nodes that want to use a long-range network. This prescribed number can either be one, or greater than one.

By way of example but not limitation, whenever the cloud service receives a query from a white-space node which includes information specifying that the node wants to use a short-range network, then the recommendation reply to the querying node will include information specifying one of the prescribed number of the available portions of the white-space spectrum which are reserved for use by white-space nodes wanting to use a short-range network. Whenever the cloud service receives a query from a white-space node which includes information specifying that the node wants to use a long-range network, and there are one or more available portions of the white-space spectrum which are not reserved for use by white-space nodes wanting to use a short-range network, and one or more of these available portions are not currently being used by any other white-space nodes, then the recommendation reply to the querying node will include a list of the available portions of the spectrum which are not reserved for use by white-space nodes wanting to use a short-range network and are not currently being used by any other white-space nodes. Whenever the cloud service receives a query from a white-space node which includes information specifying that the node wants to use a long-range network, and there is a plurality of available portions of the white-space spectrum, and all of these available portions are currently being used by other white-space nodes, then the recommendation reply to the querying node will include a list of the available portions of the spectrum which are not reserved for use by white-space nodes wanting to use a short-range network, and whose current contention level is below a prescribed threshold, and whose current interference level is below another prescribed threshold.

In another embodiment of the cloud service technique described herein the SR procedure can optimize the coexistence of one or more short-range networks and a plurality of long-range networks which all operate in a common geographic region and all want to operate in a common portion of the white-space spectrum (for whatever reason) by advising the white-space nodes using the long-range networks to have periodic synchronized "quiet intervals" during which they do not transmit. The white-space nodes using the short-range networks can then transmit during these quiet intervals without having their transmissions interfered with by the long-range networks. By way of example but not limitation, whenever the cloud service receives a query from a white-space node which includes information specifying that the node wants to use a long-range network and the node also wants to operate in a particular one of the available portions of the white-space spectrum in which one or more other short-range networks and one or more other long-range networks currently operate, then the recommendation reply to the querying node will include information specifying a periodic quiet interval which is synchronized with the one or more other long-range networks, where the querying node and the one or more other long-range networks will not transmit during the periodic quiet interval.

2.3.3 Coexistence of Wide-Band and Narrow-Band Networks

There are various ways in which the SR procedure can optimize the coexistence of one or more wide-band networks and one or more narrow-band networks which all operate in a common geographic region and all want to operate in a common portion of the white-space spectrum (for whatever reason).

In one embodiment of the cloud service technique described herein the SR procedure can optimize the coexistence of one or more wide-band networks and one or more narrow-band networks which all operate in a common geographic region and all want to operate in a common portion of the white-space spectrum by advising querying white-space nodes that want to use a wide-band network, and are capable of performing subcarrier suppression, to use subcarrier suppression to suppress one or more prescribed subcarriers (i.e., "block off" one or more prescribed portions of the spectrum) in which narrow-band networks currently operate. By way of example but not limitation, whenever the cloud service receives a query from a white-space node which includes information specifying that the node wants to use a wide-band network, and the node is capable of performing subcarrier suppression, and the node also wants to operate in a particular one of the available portions of the white-space spectrum in which one or more narrow-band networks currently operate, then the recommendation reply to the querying node will include information specifying that the node is to use subcarrier suppression to suppress one or more prescribed subcarriers in which the one or more narrow-band networks currently operate.

In another embodiment of the cloud service technique described herein the SR procedure can optimize the coexistence of one or more wide-band networks and one or more narrow-band networks which all operate in a common geographic region by advising querying white-space nodes that want to use a wide-band network, but are not capable of performing subcarrier suppression, to use different portions of the white-space spectrum than querying white-space nodes that want to use a narrow-band network (i.e., the wide-band and narrow-band networks are separated onto different portions of the spectrum). More particularly, the SR procedure can reserve a prescribed number of the available portions of the white-space spectrum for use by white-space nodes that want to use a narrow-band network, and the remaining available portions of the spectrum can be used by white-space nodes that want to use a wide-band network. This prescribed number can either be one, or greater than one.

By way of example but not limitation, whenever the cloud service receives a query from a white-space node which includes information specifying that the node wants to use a narrow-band network, then the recommendation reply to the querying node will include information specifying one of the prescribed number of the available portions of the white-space spectrum which are reserved for use by white-space nodes wanting to use a narrow-band network. Whenever the cloud service receives a query from a white-space node which includes information specifying that the node wants to use a wide-band network but the node is not capable of performing subcarrier suppression, and there are one or more available portions of the white-space spectrum which are not reserved for use by white-space nodes wanting to use a narrow-band network, and one or more of these available portions are not currently being used by any other white-space nodes, then the recommendation reply to the querying node will include a list of the available portions of the spectrum which are not reserved for use by white-space nodes wanting to use a narrow-band network and are not currently being used by any other white-space nodes. Whenever the cloud service receives a query from a white-space node which includes information specifying that the node wants to use a wide-band network but the node is not capable of performing subcarrier suppression, and there is a plurality of available portions of the white-space spectrum, and all of these available portions are currently being used by other white-space nodes, then the recommendation reply to the querying node will include a list of the available portions of the spectrum which are not reserved for use by white-space nodes wanting to use a narrow-band network, and whose current contention level is below a prescribed threshold, and whose current interference level is below another prescribed threshold.

3.0 Additional Embodiments

While the cloud service technique has been described by specific reference to embodiments thereof, it is understood that variations and modifications thereof can be made without departing from the true spirit and scope of the cloud service technique. By way of example but not limitation, rather than being used to optimize the coexistence of a plurality of white-space networks that operate in the white-space spectrum (i.e., the white-space within the broadcast TV frequency spectrum) as described heretofore, alternate embodiments of the cloud service technique are possible which optimize the coexistence of a plurality of other types of wireless networks that operate in other portions of the RF spectrum. Furthermore, the recommendation reply the cloud service sends to a querying white-space node can include information specifying a one of the available portions of the available portions of the white-space spectrum having the smallest load or the smallest number of white-space networks on it. Yet furthermore, in addition to being used to optimize the coexistence of a plurality of white-space networks that operate in the white-space spectrum in the United States, the cloud service technique embodiments described herein can also be used to optimize the coexistence of a plurality of white-space networks that operate in the white-space spectrum in other countries. As such, the cloud service technique embodiments are also operational with wireless nodes which are not FCC-certified.

It is also noted that any or all of the aforementioned embodiments can be used in any combination desired to form additional hybrid embodiments. Although the cloud service technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

Figure 5:
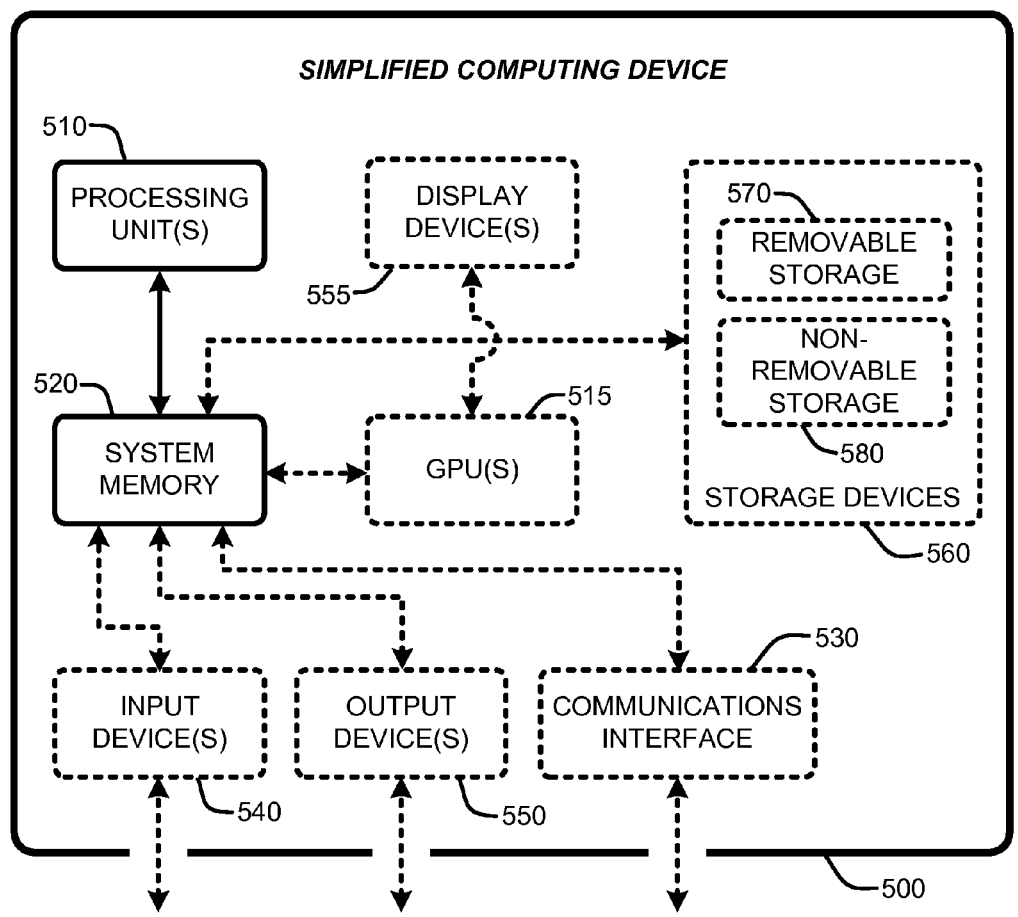
FIG. 5 is a diagram illustrating a simplified example of a general-purpose computer system on which various embodiments and elements of the cloud service technique embodiments, as described herein, may be implemented.

The cloud service technique embodiments described herein are operational within numerous types of general purpose or special purpose computing system environments or configurations. FIG. 5 illustrates a simplified example of a general-purpose computer system on which various embodiments and elements of the cloud service technique embodiments, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the cloud service technique embodiments described herein, the device should have a sufficient computational capability and system memory to enable basic computational operations. In particular, as illustrated by FIG. 5, the computational capability is generally illustrated by one or more processing unit(s) 510, and may also include one or more graphics processing units (GPUs) 515, either or both in communication with system memory 520. Note that that the processing unit(s) 510 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, and the like). The simplified computing device of FIG. 5 may also include other optional components, such as, for example, one or more conventional computer output devices 550 (e.g., display device(s) 555, audio output devices, video output devices, devices for transmitting wired or wireless data transmissions, and the like). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560, and includes both volatile and nonvolatile media that is either removable 570 and/or non-removable 580, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the cloud service technique described herein, or portions thereof, may be stored, received, transmitted, or read from any desired combination of computer or machine readable media or storage devices and communication media in the form of computer executable instructions or other data structures.

Finally, the cloud service technique embodiments described herein may be further described in the general context of computer-executable instructions, such as program modules, being executed by a computing device. Generally, program modules include routines, programs, objects, components, data structures, and the like, that perform particular tasks or implement particular abstract data types. The cloud service technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for optimizing the coexistence of a plurality of different wireless networks that concurrently operate in a common geographic region, comprising:
    using a computer to perform the following process actions:
    receiving a query from a wireless node requesting advice on specific portions of a radio frequency spectrum to use, wherein said wireless node is a wireless computing device operating in one of said wireless networks comprising a plurality of wireless nodes;
    receiving explicit information that the wireless node locally observes about current radio frequency spectrum usage, said information comprising specifying portions of the radio frequency spectrum that are not currently being used by any licensed incumbent users in the current geographic location of the wireless node;
    running a spectrum recommendation procedure to generate advice on recommended portions of the radio frequency spectrum for the wireless node to use in order to minimize one or more of interference in the spectrum, or noise in the spectrum, or contention in the spectrum using at least the received explicit information that the wireless node locally observed about current radio frequency spectrum usage; and
    sending a recommendation reply to the wireless node comprising information specifying the recommended portions of the radio frequency spectrum for the wireless node to use in order to minimize one or more of interference in the spectrum, or noise in the spectrum, or contention in the spectrum.

2. The process of claim 1, wherein the different wireless networks comprise white-space networks, the wireless node comprises a white-space node, the radio frequency spectrum comprises a white-space spectrum, and the query comprises an identifier that uniquely identifies the white-space node and information specifying a current geographic location of the white-space node.

3. The process of claim 2, wherein the process action of receiving explicit information that the wireless node locally observes about current radio frequency spectrum usage further comprises receiving explicit information that the white-space node locally observes about current white-space spectrum usage, said explicit information comprising one or more of,
    information specifying current network activities of the white-space node in a particular portion of the white-space spectrum, or
    information specifying network types of other white-space nodes that are using the white-space spectrum, or
    information specifying a current interference level the white-space node measures in one or more particular portions of the white-space spectrum, or
    information specifying a current contention level the white-space node measures in one or more particular portions of the white-space spectrum, or
    information specifying current network traffic characteristics the white-space node observes in one or more particular portions of the white-space spectrum, or
    information specifying a current noise level the white-space node measures in one or more particular portions of the white-space spectrum; and
    storing said explicit information in a database.

4. The process of claim 2, wherein the query further comprises one or more of:
    information specifying a type of white-space network the white-space node wants to use; or
    information specifying an expected network load of the white-space node; or
    information specifying network response-time needs of the white-space node; or
    a network identifier which identifies a specific wireless network that the white-space node wants to connect to; or
    information specifying wireless networking capabilities of the white-space node, said capabilities comprising one or more of whether or not the white-space node is capable of bonding a plurality of channels together, or whether or not the white-space node is capable of performing subcarrier suppression; or
    information specifying portions of the white-space spectrum that are not currently being used by any licensed incumbent users in the current geographic location of the white-space node.

5. The process of claim 2, wherein the white-space node comprises a white-space base station and the query further comprises information specifying the number of client devices that are attached to the base station and a current geographic location of each of said client devices.

6. The process of claim 2, wherein,
    the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and
    whenever the query comprises information specifying that the white-space node wants to use a long-range network, and there is a plurality of available portions of the white-space spectrum, and one or more of the plurality of available portions are not currently being used by any other white-space nodes, the recommendation reply comprises a list of the available portions of the white-space spectrum that are not currently being used by any other white-space nodes.

7. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a long-range network, and there is a plurality of available portions of the white-space spectrum, and all of the plurality of available portions are currently being used by other white-space nodes, the recommendation reply comprises a list of the available portions of the white-space spectrum whose current contention level is below a prescribed threshold and whose current interference level is below another prescribed threshold.

8. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a short-range network, the recommendation reply comprises one of a prescribed number of the available portions of the white-space spectrum which are reserved for use by white-space nodes wanting to use a short-range network.

9. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a long-range network, and there are one or more available portions of the white-space spectrum which are not reserved for use by white-space nodes wanting to use a short-range network, and one or more of said available portions are not currently being used by any other white-space nodes, the recommendation reply comprises a list of the available portions of the white-space spectrum which are not reserved for use by white-space nodes wanting to use a short-range network and are not currently being used by any other white-space nodes.

10. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a long-range network, and there is a plurality of available portions of the white-space spectrum, and all of the plurality of available portions are currently being used by other white-space nodes, the recommendation reply comprises a list of the available portions of the white-space spectrum which are not reserved for use by white-space nodes wanting to use a short-range network, and whose current contention level is below a prescribed threshold, and whose current interference level is below another prescribed threshold.

11. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a long-range network and said node also wants to operate in a particular one of the available portions of the white-space spectrum in which one or more short-range networks and one or more other long-range networks currently operate, the recommendation reply comprises information specifying a periodic quiet interval which is synchronized with the one or more other long-range networks, wherein said node and the one or more other long-range networks will not transmit during the periodic quiet interval.

12. The process of claim 2, wherein, the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and whenever the query comprises information specifying that the white-space node wants to use a wide-band network, and said node is capable of performing subcarrier suppression, and said node wants to operate in a particular one of the available portions of the white-space spectrum in which one or more narrow-band networks currently operate, the recommendation reply comprises information specifying that said node is to use subcarrier suppression to suppress one or more prescribed subcarriers in which the one or more narrow-band networks currently operate.

13. The process of claim 2, wherein,
the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and
whenever the query comprises information specifying that the white-space node wants to use a narrow-band network, the recommendation reply comprises information specifying one of a prescribed number of the available portions of the white-space spectrum which are reserved for use by white-space nodes wanting to use a narrow-band network.

14. The process of claim 2, wherein,
the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and
whenever the query comprises information specifying that the white-space node wants to use a wide-band network but said node is not capable of performing subcarrier suppression, and there are one or more available portions of the white-space spectrum which are not reserved for use by white-space nodes wanting to use a narrow-band network, and one or more of said available, portions are not currently being used by any other white-space nodes, the recommendation reply comprises information specifying a list of the available portions of the white-space spectrum which are not reserved for use by white-space nodes wanting to use a narrow-band network and are not currently being used by any other white-space nodes.

15. The process of claim 2, wherein,
the process action of running a spectrum recommendation procedure to generate advice on recommended portions of the radio frequency spectrum for the wireless node to use in order to minimize one or more of interference in the spectrum, or noise in the spectrum, or contention in the spectrum comprises an action of determining available portions of the white-space spectrum, said available portions comprising portions of the white-space spectrum that are not currently being used by any licensed incumbent users in a geographic region comprising the current geographic location of the white-space node, and
whenever the query comprises information specifying that said node wants to use a wide-band network but said node is not capable of performing subcarrier suppression, and there is a plurality of available portions of the white-space spectrum, and all of said available portions are currently being used by other white-space nodes, the recommendation reply comprises information specifying a list of the available portions of the white-space spectrum which are not reserved for use by white-space nodes wanting to use a narrow-band network, and whose current contention level is below a prescribed threshold, and whose current interference level is below another prescribed threshold.

16. A computer-implemented process for optimizing the coexistence of a plurality of different wireless networks that concurrently operate in a common geographic region, comprising:
using a wireless computing device operating in one of said wireless networks comprising a plurality of wireless computing devices to perform the following process actions:
sending a query to a cloud service requesting advice on specific portions of a radio frequency spectrum to use;
sending explicit information to the cloud service that the wireless computing device locally observes about current radio frequency spectrum usage, said information comprising specifying portions of the radio frequency spectrum that are not currently being used by any licensed incumbent users in the current geographic location of the wireless node;
receiving a recommendation reply from the cloud service comprising information specifying recommended portions of the radio frequency spectrum to use in order to minimize one or more of interference in the spectrum, or noise in the spectrum, or contention in the spectrum, said information being based on at least the sent explicit information that the wireless node locally observed about current radio frequency spectrum usage;
selecting one of the recommended portions of the radio frequency spectrum from said information; and
configuring a wireless transmitter and a wireless receiver to communicate in the selected portion of the radio frequency spectrum.

17. The process of claim 16, wherein the different wireless networks comprise white-space networks, the radio frequency spectrum comprises a white-space spectrum, and the information specifying recommended portions of the radio frequency spectrum to use comprises either a list of recommended television channels in the white-space spectrum, or a list of recommended frequency bands in the white-space spectrum.

18. The process of claim 16, wherein the recommendation reply further comprises information specifying one or more of,
a recommended transmission power level to use, or
a recommended subcarrier to suppress, or
a recommended modulation scheme to use.

19. The process of claim 18, further comprising the actions of:
whenever the recommendation reply comprises information specifying a recommended transmission power level to use, configuring the wireless transmitter to transmit at said power level;

whenever the recommendation reply comprises information specifying a recommended subcarrier to suppress, configuring the wireless transmitter to suppress said subcarrier; and whenever the recommendation reply comprises information specifying a recommended modulation scheme to use, configuring the wireless transmitter to perform said modulation scheme.

20. A computer-implemented process for optimizing the coexistence of a plurality of different white-space networks that concurrently operate in a common geographic region, comprising:

using a computer to perform the following process actions:

receiving a query from a white-space node requesting advice on specific portions of a white-space spectrum to use, wherein said white-space node is a wireless computing device operating in one of said white-space networks comprising a plurality of white-space nodes, and wherein the query comprises, an identifier that uniquely identifies the white-space node, information specifying a current geographic location of the white-space node, information specifying that the white-space node wants to use a long-range network, and information specifying available portions of the white-space spectrum, said available portions comprising portions of the white-space spectrum that are not currently being used by any licensed incumbent users in a geographic region comprising said location;

running a spectrum recommendation procedure to generate advice on recommended portions of the white-space spectrum for the white-space node to use in order to minimize one or more of interference in the spectrum, or noise in the spectrum, or contention in the spectrum; and sending a recommendation reply comprising said advice to the white-space node, wherein whenever there is a plurality of available portions of the white-space spectrum and all of the plurality of available portions are currently being used by other white-space nodes, said advice comprises a list of the available portions of the white-space spectrum which are not reserved for use by white-space nodes wanting to use a short-range network, and whose current contention level is below a prescribed threshold, and whose current interference level is below another prescribed threshold.

* * * * *